(No Model.)
W. D. HOOKER.
HAND LEVER ATTACHMENT FOR STEAM PUMPS.
No. 251,715. Patented Jan. 3, 1882.
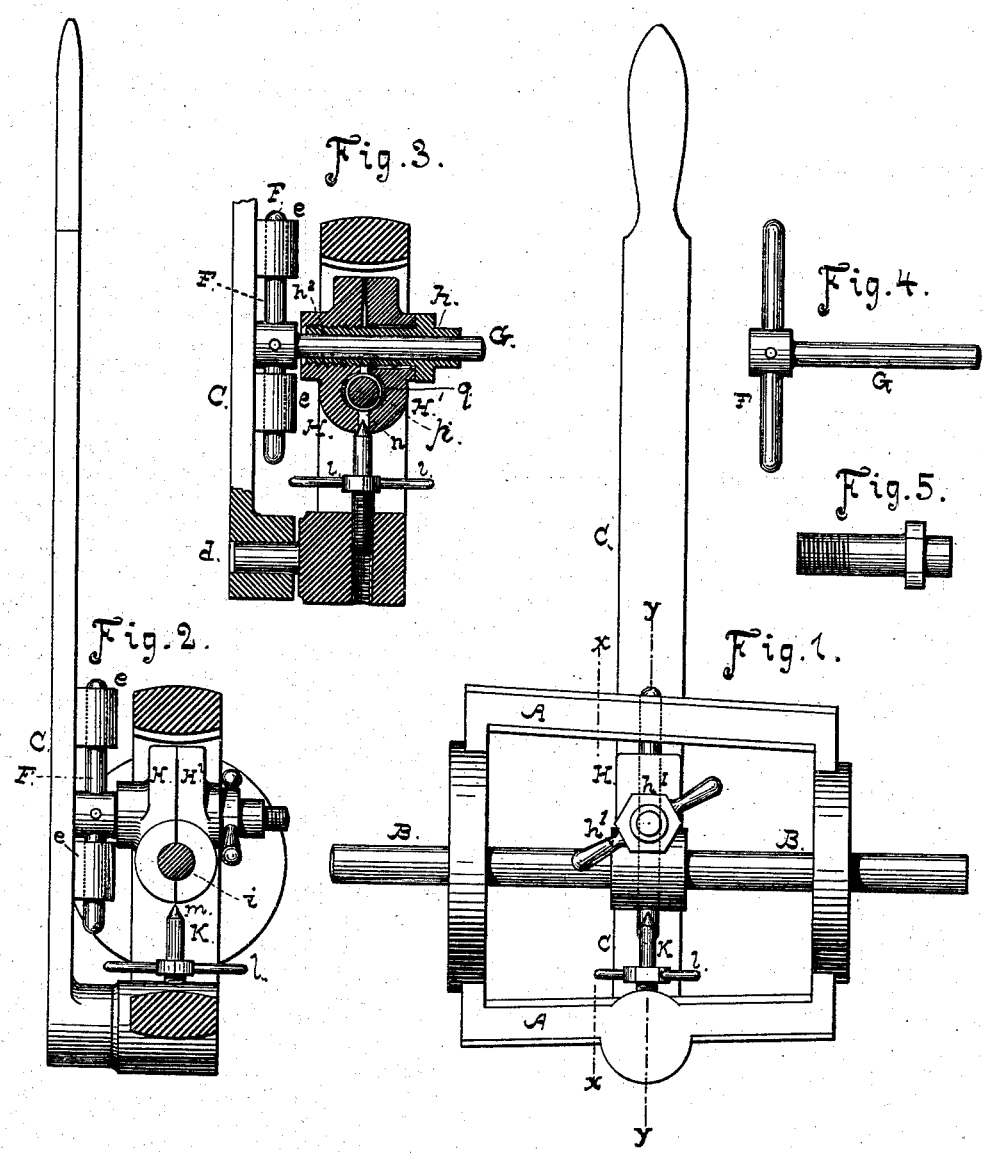

UNITED STATES PATENT OFFICE.

WILLIAM D. HOOKER, OF OAKLAND, CALIFORNIA.

HAND-LEVER ATTACHMENT FOR STEAM-PUMPS.

SPECIFICATION forming part of Letters Patent No. 251,715, dated January 3, 1882.

Application filed May 13, 1881. (No model.)

*To all whom it may concern:*

Be it known that I, WILLIAM D. HOOKER, of Oakland, Alameda county, California, have made and invented a new and useful Improvement in Hand-Lever Attachments for Steam-Pumps; and I do hereby declare that the following is a full, clear, and exact description of my said invention, reference being had to the accompanying drawings.
My invention relates to a means for connecting an oscillating arm or lever with a rod having a movement in a right line, whereby the oscillation of one part will produce a reciprocation of the other part. It is intended more particularly for connecting a hand-lever with the piston-rod of a steam-pump.

It consists of a wrist-pin with a cross bar or rod projecting at right angles across its head and adapted to slide in bearings in the oscillating lever, and to oscillate in a socket provided in a block upon the piston-rod; and it consists, also, in connecting the block with the piston-rod by means of a groove in the rod and a projection on the inside of the bearing in the block, and in making the block in two parts or sections, so that it can either be clamped and secured on the piston-rod or be loosened thereon and held from moving with the rod.
Referring to the accompanying drawings, Figure 1 is a side elevation, showing the lever attachment connected with the piston-rod. Fig. 2 is a cross-section through line $x$, Fig. 1. Fig. 3 is a section through line $y$, Fig. 1. Fig. 4 is a view of the right-angled wrist-pin. Fig. 5 is a view of the hollow screwed sleeve.

A may represent the parts in which are the bearings for the piston rod B.

At one side of the frame A, I pivot an arm or lever, C, so that by applying power to the free end or handle of the lever it can be moved back and forth on the stud $d$ as a center.

Upon the piston-rod B, I fix a block, H, in which is a socket, $h$, to receive the part G of the right-angle wrist-pin, and upon the side of the lever next to the piston-rod I provide bearings $e\ e$ in lugs upon each side of the line of the pin G, to receive and form guides and bearings for the cross pin or rod F of the wrist-pin. Thus by means of the bearings $e\ e$ and the clamp H, with its socket, the right-angle pin is connected with and forms the attachment between the lever C and the piston-rod. The wrist-pin F G, being connected with and carried by the lever C, and having also a bearing in the block H, must be free to turn in the bearing $h$, and have also a loose connection with the lever, so that it may slide in its bearings and give no lateral strain or unequal pressure of the parts in their bearings. The wrist-pin, therefore, in addition to its movement in a straight line, has also an oscillating motion in its bearing in the block H.

To permit of the ready detachment of the parts from the piston-rod, so that it may be left free to move without carrying the lever C with it, I divide the block H into two parts longitudinally through the hole or socket $i$, that receives the piston-rod, and then, by means of the hollow screw-threaded sleeve $h$ and the hand-nut $h'$ on the outer end, I draw and hold the two parts together around the rod. The sleeve $h$ also serves as a socket for the wrist-pin G. The screw-threaded portion $h^2$ of the sleeve $h$ works in the part H of the block or clamp; but the smooth portion, which extends through the remaining half or section of the clamp, is fitted loosely therein, so that the two parts may be separated and spread apart while still surrounding the rod. To hold these parts H H' apart when the screw-sleeve is loosened, I place upon the frame, or some fixed point beneath and in line with the block H, a short pin, K, with a conical or tapering head, $m$, and a nut, $l$, for turning it by hand. The end of the pin, being screw-threaded and working in a bearing of like character, can be made longer or shorter, and its head brought up to or away from the lower side of the block H. A tapering hole, $n$, is made in the block between the joint of line of meeting of the parts H H in line with the pin K, so that when brought into position over the pin it will receive the head $m$ when the pin is turned up or lengthened, which movement will force the conical head in between the parts H and separate them when the screw-sleeve is loosened. When thus separated the piston-rod will be left free to move through the block, while the lever and the parts will be held at rest and locked by the pin K.

I also insure the attachment of the block H to the piston-rod when clamped together around it by forming a small groove, p, in the circumference of the piston-rod, into which a small projection, q, on the inner side of the bore i through the block is caused to fit, and thus prevent the rod from slipping through the block. When the parts are separated to release the piston-rod they will be spread apart by the pin K a sufficient distance to draw this projection out of the slot or groove q.

This construction and application is of especial value in pumps where the stroke of the piston is longer than the distance between the glands of the steam and the water cylinders. By opening the clamps, as before described, the handle and its attachment are held rigidly in place and the piston is left free to make its full length of stroke.

One of the advantages obtained in the application of my improvement to a steam-pump is a shorter movement of the hand-lever as compared with the stroke of the piston-rod, which is due to the reciprocal motion of the right-angled bearing in the guides of the hand-lever and its oscillating motion in the piston-rod. When the lever is worked by hand the distance traveled by the body of the person is less than with an ordinary lever, as the handle or lever is worked in a much less space.

Having thus fully described my invention, what I claim, and desire to secure by Letters Patent, is—

1. In combination with the pivoted oscillating lever C and the reciprocating rod B, the right-angle oscillating reciprocating pin adapted to slide in one part and to oscillate in the other part, substantially as described.

2. In combination with the oscillating lever C, having the bearings e e, and the clamping-block H, having the socket h, the right-angle oscillating reciprocating wrist-pin F G, arranged and applied substantially as described, to operate as set forth.

3. In combination with the oscillating reciprocating wrist-pin F G, held in bearings on the oscillating lever C, the clamp formed of the part or sections H and the hollow sleeve h, screw-threaded on its end, which holds the parts H together, and also forms the socket for the pin, substantially as herein described.

4. The combination, with the oscillating lever, of the two-part clamp H, the screw-threaded sleeve h, the piston-rod B, with its groove q, and the projection on the inner surface of the clamp, substantially as and for the purpose described.

5. The combination of the oscillating lever with the two part clamp H, the screw-threaded sleeve h, the oscillating reciprocating wrist-pin F G, and the screw pin or wedge, substantially as and for the purpose described.

6. The combination of the oscillating and reciprocating wrist-pin F G with the oscillating lever C and its guides e e, the piston-rod, clamp H, and the screw pin or wedge, substantially as and for the purpose described.

Witness my hand and seal.

WILLIAM DAVIS HOOKER. [L. S.]

Witnesses:
EDWARD E. OSBORN,
WM. F. CLARK.